United States Patent [19]

Mori et al.

[11] Patent Number: 5,060,059
[45] Date of Patent: Oct. 22, 1991

[54] COLOR IMAGE PROCESSING APPARATUS FOR CONVERTING COLOR-SEQUENTIAL IMAGE DATA INTO COLOR-PARALLEL IMAGE DATA

[75] Inventors: Tetsuzo Mori, Hiratsuka; Takashi Sugino, Atsugi; Makoto Takaoka, Atsugi; Susumu Sugiura, Atsugi; Hiroyuki Ichikawa, Kawasaki, all of Japan

[73] Assignee: Canon Kabushiki Kaisha, Tokyo, Japan

[21] Appl. No.: 372,172

[22] Filed: Jun. 27, 1989

Related U.S. Application Data

[63] Continuation of Ser. No. 900,604, Aug. 26, 1986, abandoned.

[30] Foreign Application Priority Data

Jan. 14, 1986 [JP] Japan .................................. 61-4161
Jan. 14, 1986 [JP] Japan .................................. 61-4163
Jul. 26, 1986 [JP] Japan ................................ 61-176161

[51] Int. Cl.$^5$ .......................... H04N 1/46; H04N 1/40
[52] U.S. Cl. .......................................... 358/79; 358/80
[58] Field of Search ........................ 358/75, 78, 79, 80

[56] References Cited

U.S. PATENT DOCUMENTS 3,555,262 1/1971 Shimada .............................. 235/193
4,315,280 2/1982 Tsuda ................................... 358/80
4,346,401 8/1982 Ohara ................................... 358/75
4,682,216 7/1987 Sasaki et al. .......................... 358/79
4,684,978 8/1987 Yamada ................................ 358/75
4,713,684 12/1987 Kawamura et al. .................. 358/78
4,739,397 4/1988 Hayashi ............................... 358/80

FOREIGN PATENT DOCUMENTS 0096090 12/1983 European Pat. Off. .
0145801 6/1985 European Pat. Off. .
2810255 9/1979 Fed. Rep. of Germany .
3408334 9/1984 Fed. Rep. of Germany .
3426530 2/1985 Fed. Rep. of Germany .
60-182849 9/1985 Japan .

OTHER PUBLICATIONS

Klischograph 1982, p. 22.

*Primary Examiner*—Howard W. Britton
*Attorney, Agent, or Firm*—Fitzpatrick, Cella, Harper & Scinto

[57] ABSTRACT

A color image processing apparatus includes line sensors and an A/D converter for entering color-sequential image data in which plural color component signals are sequentially arranged, a first converter for converting the color-sequential image data into parallel image data, a color image processor for effecting color image processing on the parallel image data obtained from the first converter, a second converter for converting the parallel image data into color-sequential image data, and a device for supplying the color-sequential image data converted by the second converter to the color-sequential image data processor at a next stage in the processing of the color component signals.

15 Claims, 16 Drawing Sheets

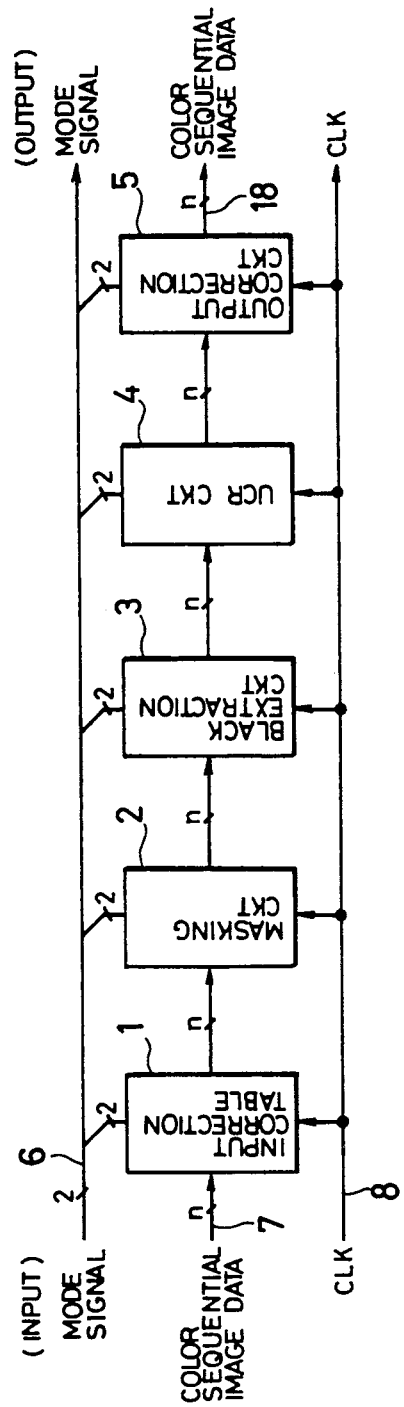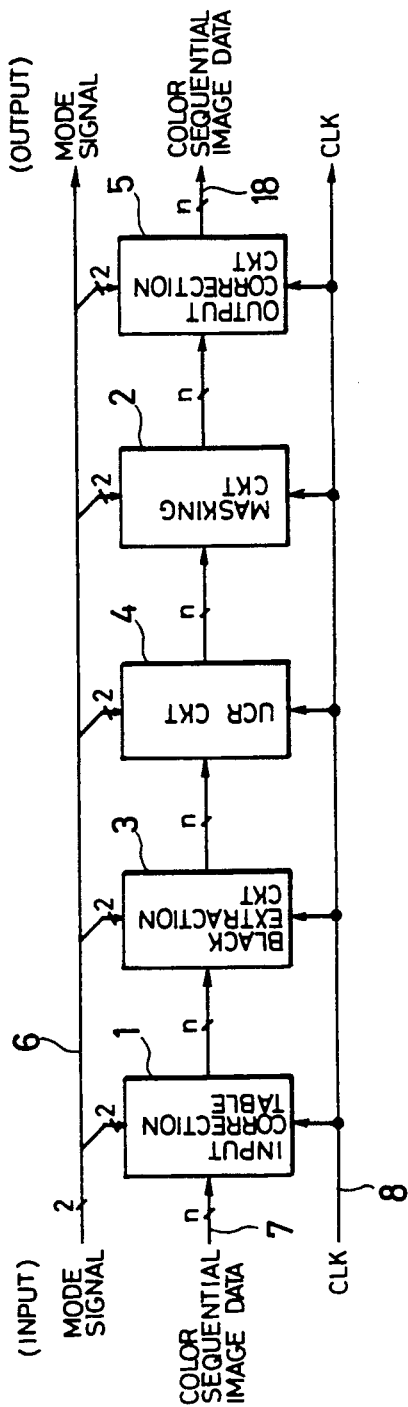

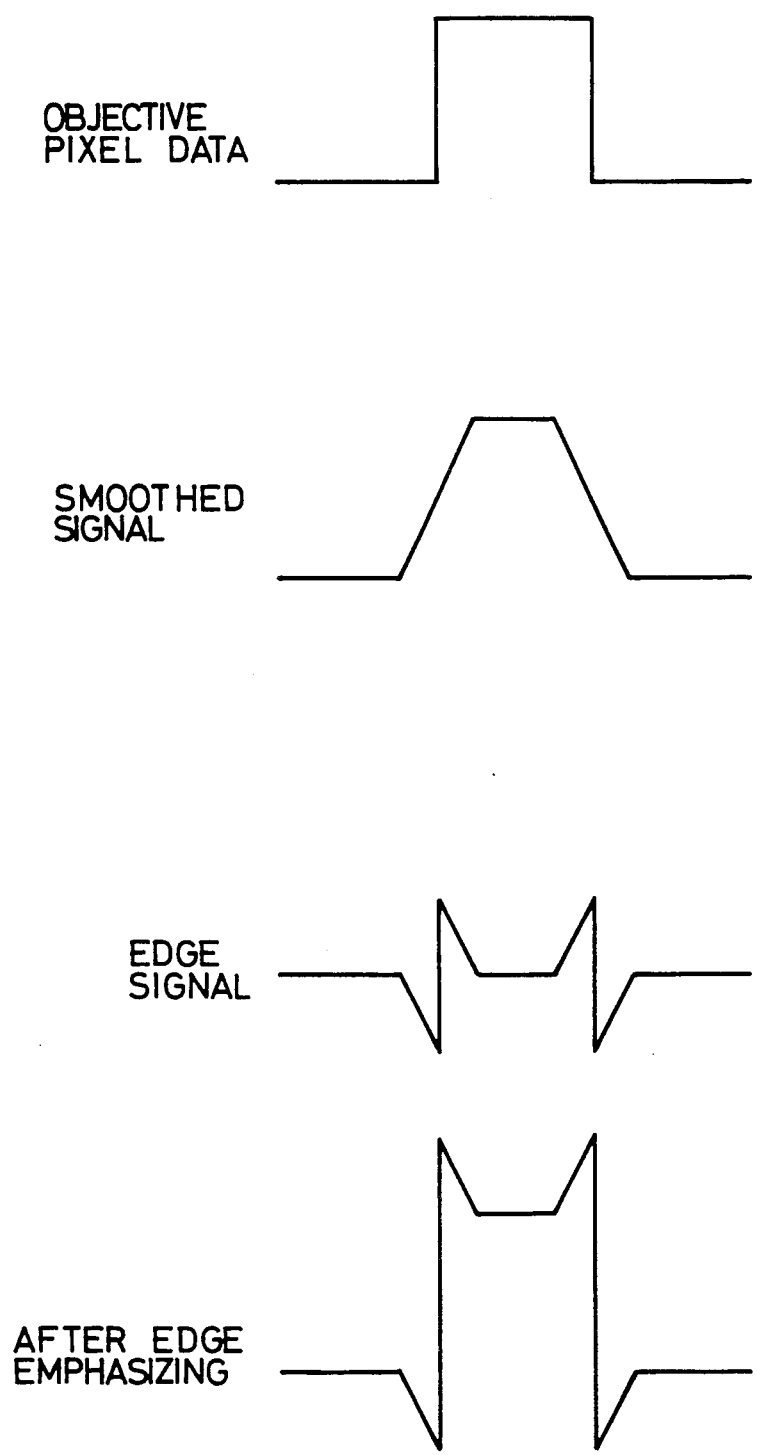

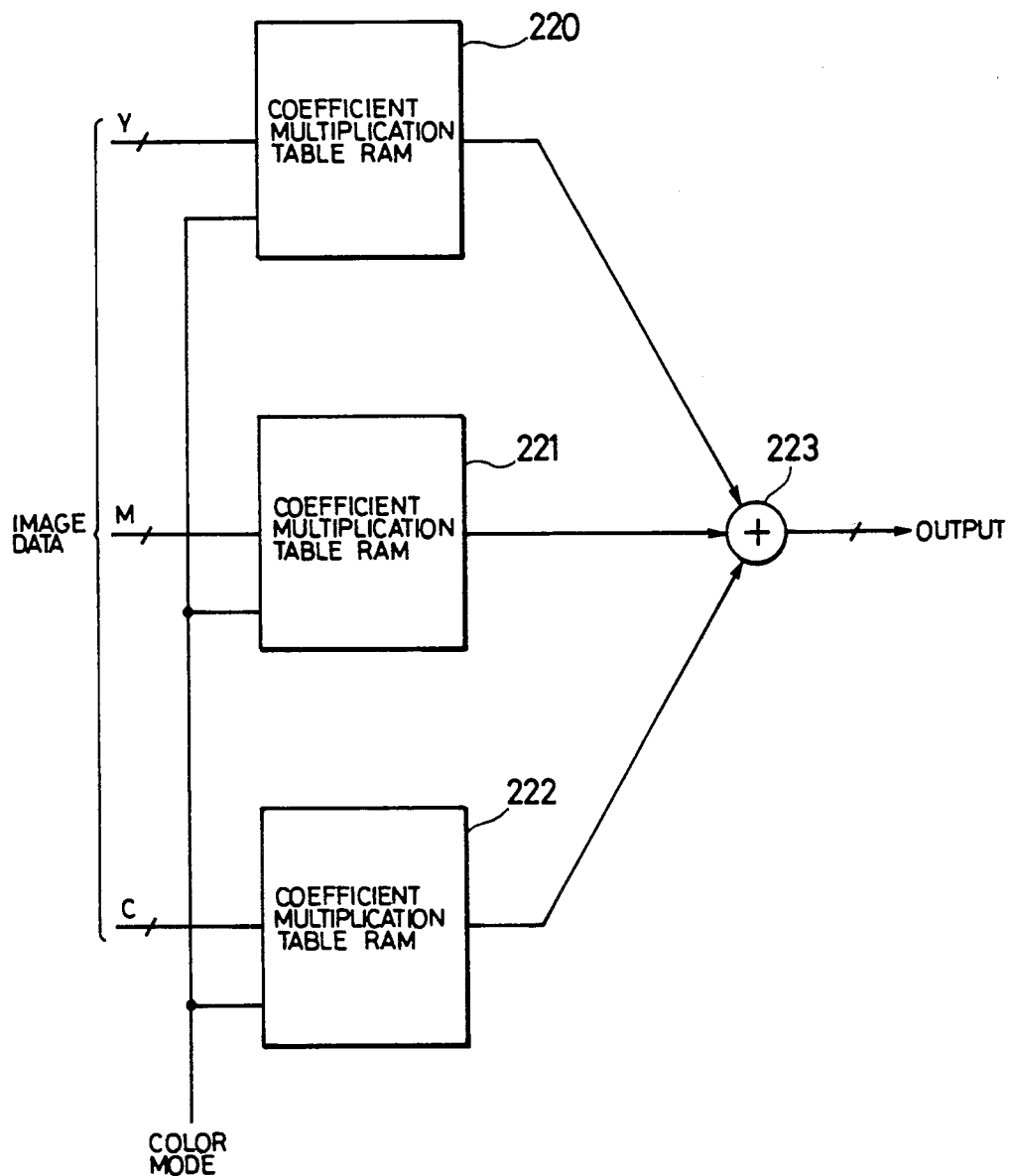

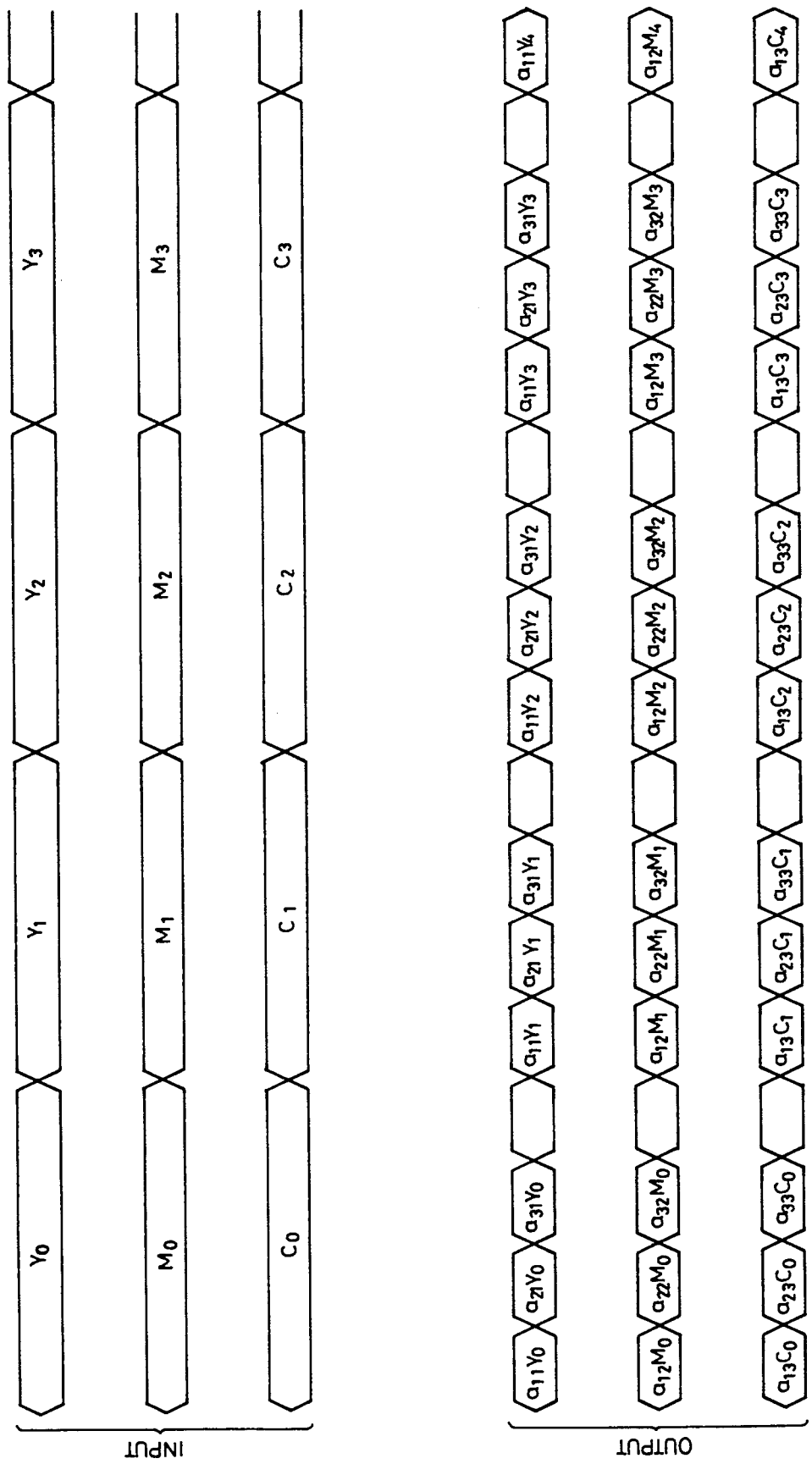

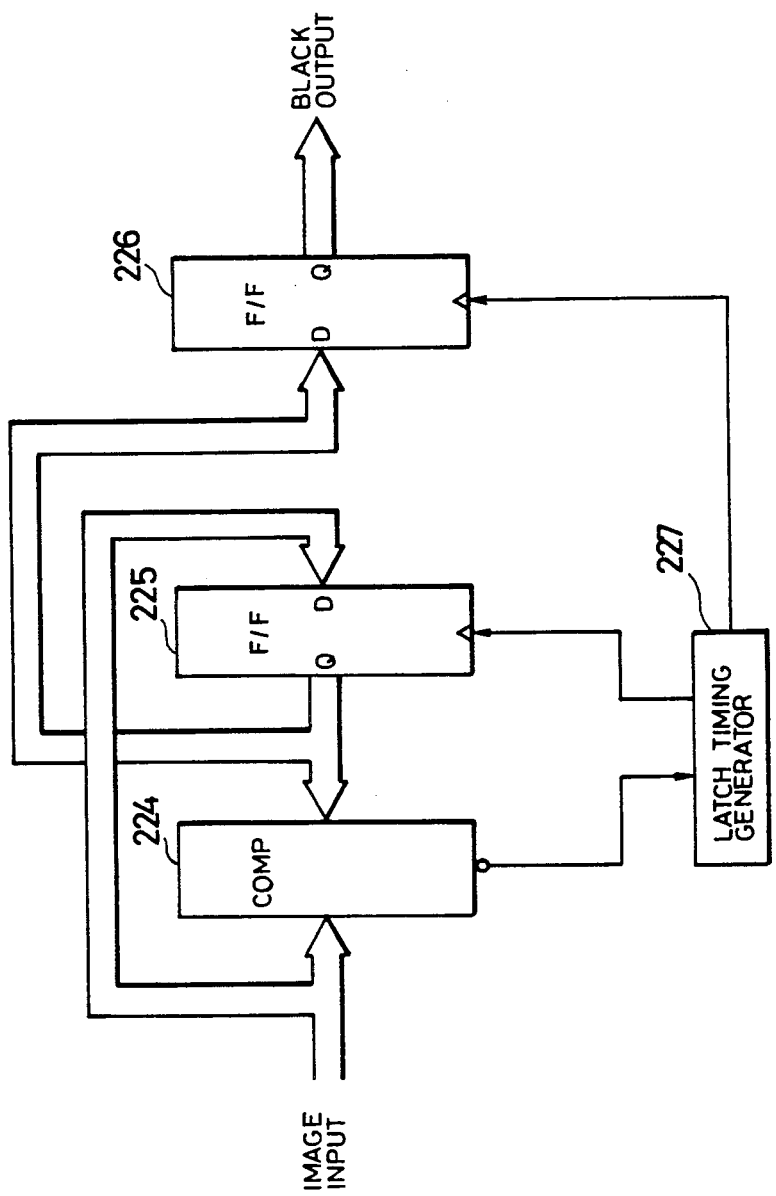

| MODE | MEANING |
|---|---|
| 0 0 | CONTENTS OF COLOR SEQUENTIAL DATA ARE YELLOW DATA |
| 0 1 | CONTENTS OF COLOR SEQUENTIAL DATA ARE MAGENTA DATA |
| 1 0 | CONTENTS OF COLOR SEQUENTIAL DATA ARE CYAN DATA |
| 1 1 | CONTENTS OF COLOR SEQUENTIAL DATA ARE BLACK DATA |

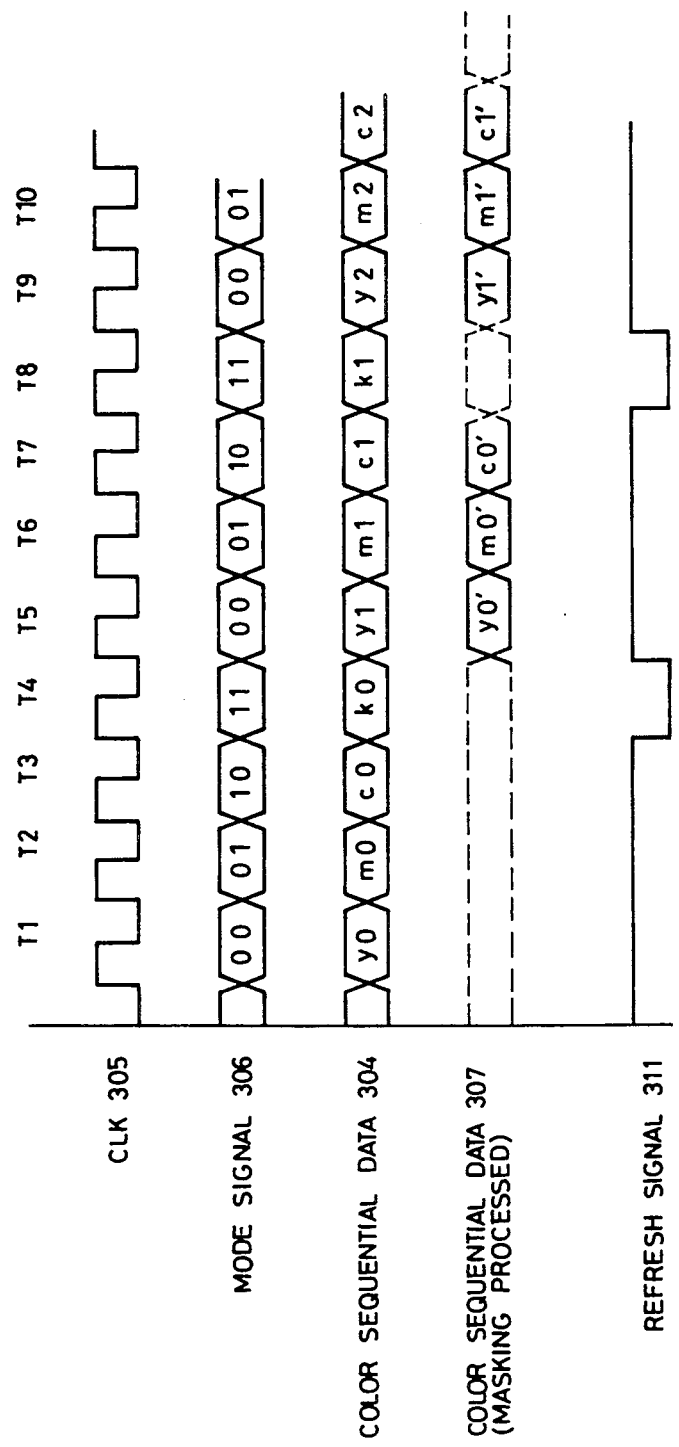

COLOR IMAGE PROCESSING APPARATUS FOR CONVERTING COLOR-SEQUENTIAL IMAGE DATA INTO COLOR-PARALLEL IMAGE DATA

This application is a continuation of application Ser. No. 900,604, filed Aug. 26, 1986, now abandoned.

BACKGROUND OF THE INVENTION

2. Field of the Invention

The present invention relates to a color image processing apparatus, and in particular to such an apparatus suitable for sequential color image processing.

2. Related Background Art

For example, in a digital color copying machine, a color image has conventionally been prepared by reading color data of red (R), green (G) and blue (B), then converting the image data into digital data, subjecting the digital data to data processing and supplying the processed data to an image forming unit such as a laser beam printer, a liquid crystal printer or an ink jet printer.

This data processing has generally been conducted in parallel on the color data of red (R), green (G) and blue (B) or of yellow (Y), magenta (M), cyan (C) and black (BK).

For this reason there has been required an independent circuit for each color signal, and there has therefore also been required a large and expensive circuit structure.

Also a masking circuit, constituting a part of the color image processing circuit, has been composed of a logic circuit without a table memory, or a table memory utilizing a static random access memory (RAM) or a readonly memory (ROM). However the masking operation with the former masking circuit is only capable of simple linear conversions, while the latter structure with a static RAM is inevitably expensive in case of forming a masking table of a large capacity and is unsuitable for compactization as it requires a large area for mounting integrated circuits. Also a structure with a ROM not only requires a large area as in the case of the circuit with a static RAM but also does not accept alteration of masking data.

SUMMARY OF THE INVENTION

An object of the present invention is to provide a color image processing apparatus not associated with the above-explained drawbacks of the prior technology.

Another object of the present invention is to provide a color image processing apparatus capable of reducing the magnitude of circuitry by sequential processing of color component signals.

Still another object of the present invention is to provide a color image processing apparatus provided with a simple structure for converting color sequential color image data into parallel image data, thereby providing an apparatus capable of processing color sequential image data with a limited circuit structure.

Still another object of the present invention is to provide an apparatus capable of color-sequential realtime processing of entered color-sequential image data without utilizing a separate circuit for each circuit.

Still another object of the present invention is to provide a color masking circuit capable of forming a masking table of a large capacity with a small circuit area and allowing for variations in masking data.

Still another object of the present invention is to provide a black extracting circuit, an under-color removal circuit, a gamma correction circuit, a spatial filtering circuit, an intermediate tone image processing circuit or the like easily adaptable to color-sequential processing.

The foregoing and still other objects of the present invention will become fully apparent from the following description, to be taken in conjunction with the attached drawings.

BRIEF DESCRIPTION OF THE DRAWINGS

FIG. 2 is a schematic block diagram of the color image processing apparatus of the first embodiment;

FIG. 3 is a block diagram of a color image processing apparatus constituting a variation of the first embodiment;

FIG. 7 is a timing chart showing processes of smoothing and edge enhancement;

FIG. 9A is a circuit diagram of a masking circuit;

FIG. 9B is a timing chart showing signals in the circuit shown in FIG. 9A;

FIG. 10 is a circuit diagram of a black extraction circuit of the present invention;

FIG. 19 is a timing chart showing input and output signals of the masking circuit.

DETAILED DESCRIPTION OF THE PREFERRED EMBODIMENTS

First embodiment

In the following there will be given an explanation on a first embodiment of the present invention while making reference to the attached drawings.

Block diagrams of a color image processing apparatus

Figure 4:
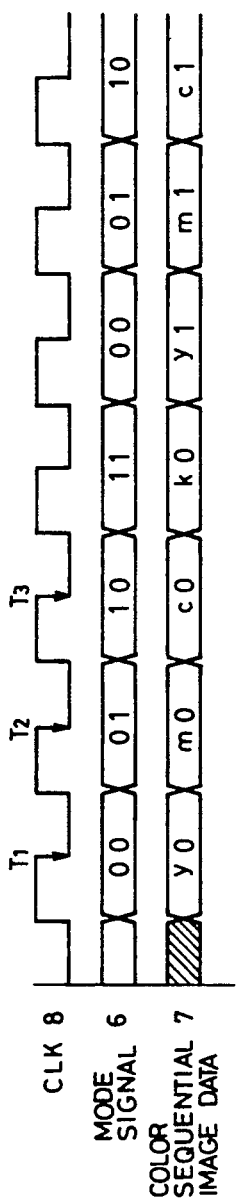
FIG. 4 is a timing chart of an input signal.

FIGS. 2 to 4

FIG. 2 is a schematic block diagram of a color image processing apparatus constituting an embodiment of the present invention.

There are provided an input correction table 1 for correcting color image data modulated according to the characteristics of an image input device; a masking circuit 2 for effecting a color masking process according to the spectral characteristics of inks to be employed in a printing unit for carrying out a printing operation according to the color image data; a black extraction circuit 3 for calculating black data from color-sequential data released from the masking circuit 2; an under-color removal (UCR) circuit 4 for effecting under-color removal, according to the black data determined in the black extraction circuit 4; and an output correction table 5 for correcting image data released from the UCR circuit 4, according to the tonal characteristics of the printing unit.

FIG. 3 shows a variation of the color image processing apparatus shown in FIG. 2, wherein the masking circuit 2 is connected behind the UCR circuit 4, in order to effect a color correction by subtracting, from each separate color component, densities of other color components.

FIG. 4 is a timing chart showing a clock signal 8, a mode signal 6 and color-sequential image data 7.

The mode signal 6 indicates the color of the colorsequential image data, wherein "00" stands for yellow, "01" for magenta, "10" for cyan and "11" for black. The color-sequential image data 7 is synchronized with the clock signal 8, wherein the data of each color (y0, m0, c0, k0) have n bits.

Structure of color image processing apparatus

FIG. 1

Figure 1:
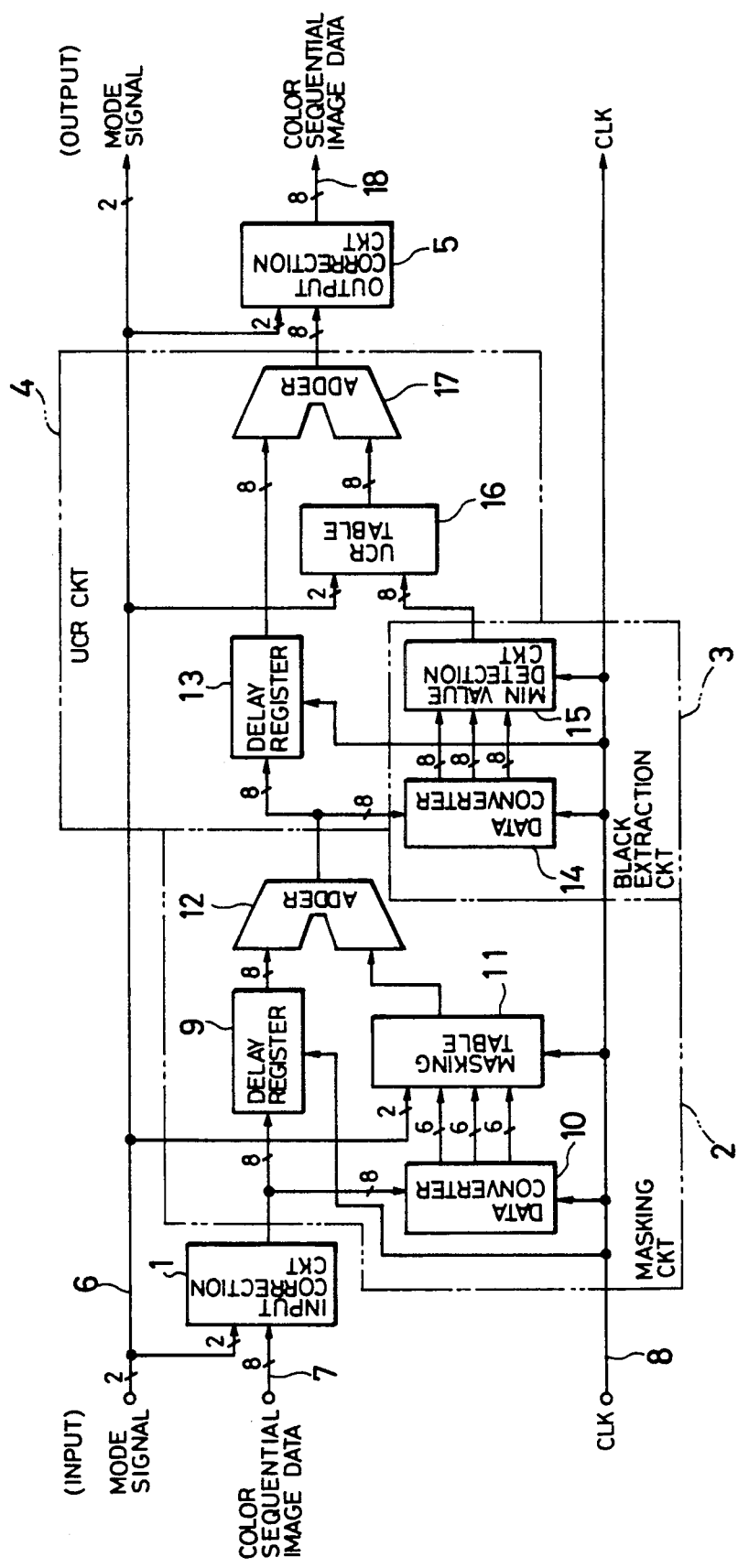
FIG. 1 is a partial detailed block diagram of a color image processing apparatus constituting a first embodiment of the present invention.

FIG. 1 is a detailed block diagram of the color image processing apparatus of the present embodiment, wherein same components as those shown in FIGS. 2 and 3 are represented by same numbers or symbols.

It is assumed that the signals shown in FIG. 4 are entered into the apparatus, wherein y0, m0 and. c0 are first image data of respectively yellow, magenta and cyan, and y1, m1 and c1 are second image data of these respective colors. Such 8-bit color-sequential image data 7 are supplied to the input correction table 1, which releases 8-bit correction data according to the mode signal 6 and the color-sequential image data. Thus released output data are divided into two, of which one is supplied to a data converter 10 for conversion into 6-bit parallel image data to be supplied to a masking table 11. Receiving the mode signal 6 and the image data of each color, the masking table 11 supplies an adder 12 with table values, in a color-sequential manner, corresponding to the parallel image data. The other output of the input correction table 1 is supplied to the adder 12 through a delaying register 9 so as to be synchronized with the output of the masking table 11.

The image processing conducted in the masking circuit 2, composed of the data converter 10, delaying register 9, masking table 11 and adder 12, can be represented by the following numerical equations, in a first-order approximation:

$$Y' = 1 + (\alpha_1 Y + \alpha_2 M + \alpha_3 C)$$

$$M' = 1 + (\beta_1 Y + \beta_2 M + \beta_3 C)$$

$$C' = 1 + (\gamma_1 Y + \gamma_2 M + \gamma_3 C)$$

wherein Y', M' and C' are masked image data of different colors released from the adder 12, Y, M and C are input image data of different colors, and $\alpha_i$, $\beta_i$ and $\gamma_i$ (i=1-3) are coefficients.

The first term "1" on the right-hand side of each equation corresponds to the output data of the delaying register 9, while the function in the parenthesis on the right-hand side of each equation corresponds to image data of each color component released by the masking table 11 in response to the mode signal 6.

The data converter 10 reduces the precision of 8-bit input to 6 bits in the output, because a loss in precision of the input data Y, M, C only negligibly affects the precision of the output data Y', M', C' due to actually found relationships in the foregoing masking equations:

$$\alpha_1 Y + \alpha_2 M + \alpha_3 C << 1$$

$$\beta_1 Y + \beta_2 M + \beta_3 C << 1$$

$$\gamma_1 Y + \gamma_2 M + \gamma_3 C << 1$$

Such conversion into 6-bit parallel image data by the data converter 19 reduces to reduce the capacity of the masking table 11.

The color-sequential data released from the adder 12 are supplied to a black extraction circuit 3, composed of a data converter 14 and a minimum value detection circuit 15, and simultaneously to a delaying register 13. The data converter 14 converts the color-sequential data into parallel image data in the same manner as the data $ converter 10, and supplies the parallel image data to the minimum value detection circuit 15, which calculates, as black data, the minimum value of the parallel image data.

The undercolor removal (UCR) circuit 4 is provided with a UCR table 16 for determining the amount of under-color removal in response to the image (black) data from the minimum value detection circuit 15, and an adder 17 for effecting the under-color removal according to the output of the UCR table 16 and for adding the minimum data (black data) calculated in circuit 15 to the color-sequential data from a delaying register 13.

The minimum value detection circuit 15 supplies the black data to the UCR table 16, which thus supplies the adder 17 with a compliment of the amount of under-color removal for each mode of the mode signal 6. The delaying register 13 so delays the output of the adder 12 as to synchronize two inputs to the adder 17.

The adder 17 effects under-color removal on the color-sequential data and replaces the black dummy data of the color-sequential data with the black data calculated in the minimum value detection circuit 15. The color-sequential data of all colors Y, M, C and K prepared in this manner are supplied to the output correction table 5 for correction according to the tonal characteristics of the printing unit.

Figure 5:
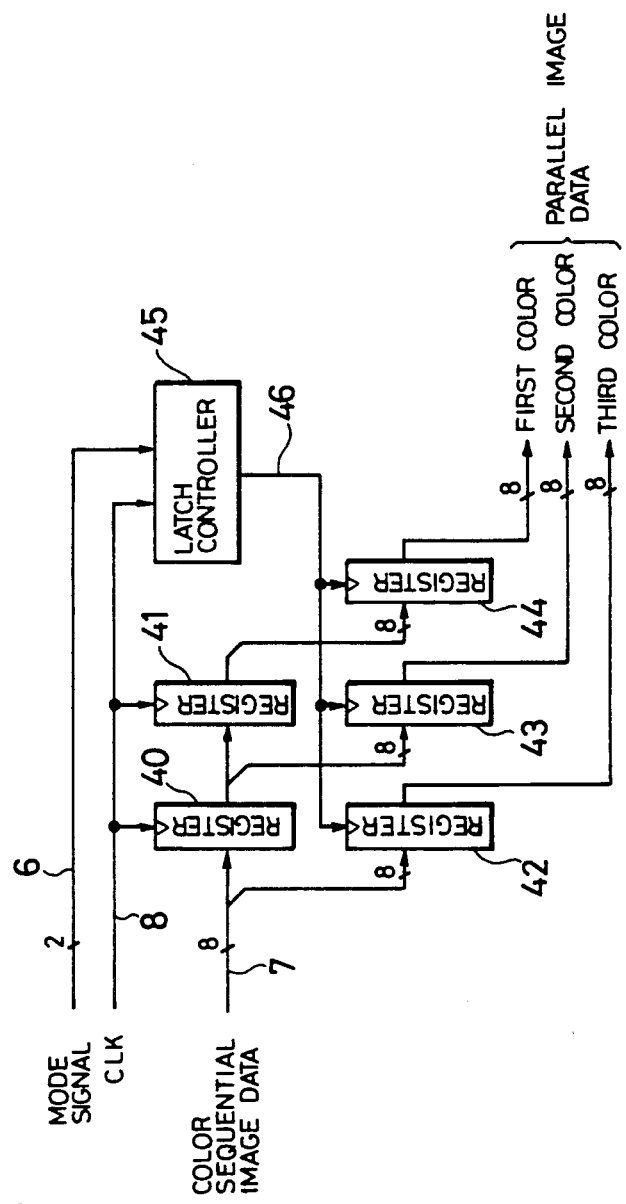
FIG. 5 is a detailed block diagram of a data converter of the present invention.

Explanation of data converter: FIGS. 4 and 5

FIG. 5 is a block diagram of a data converter provided with 8-bit registers 40–44 and a latch controller 45 for releasing latch signals 46 for the registers in response to the mode signal 6 and the clock signal 8.

It is now assumed that the mode signal 6, color-sequential image data 7 and clock signal 8 are entered as shown in FIG. 4, and each of the registers 40–44 is latched at the end of the clock signal Thus data y0 are latched in the register 40 at a timing T1 in FIG. 4, and a latch signal 46 is released at a timing T3, thus storing data y0, m0 and c0 respectively in the registers 44, 43 and 42. In this manner the data converter releases 8-bit color image data in parallel manner.

As explained in the foregoing, the present embodiment is provided with data converters for conversion of color-sequential image data into parallel data in the masking circuit and in the black extraction circuit where parallel image data are needed, and effects image processing on color-sequential image data in other sections, thereby:

(1) reducing the number of circuit components and compactizing the apparatus; and
(2) reducing the cost of the color image processing apparatus.

Second embodiment

Figure 6:
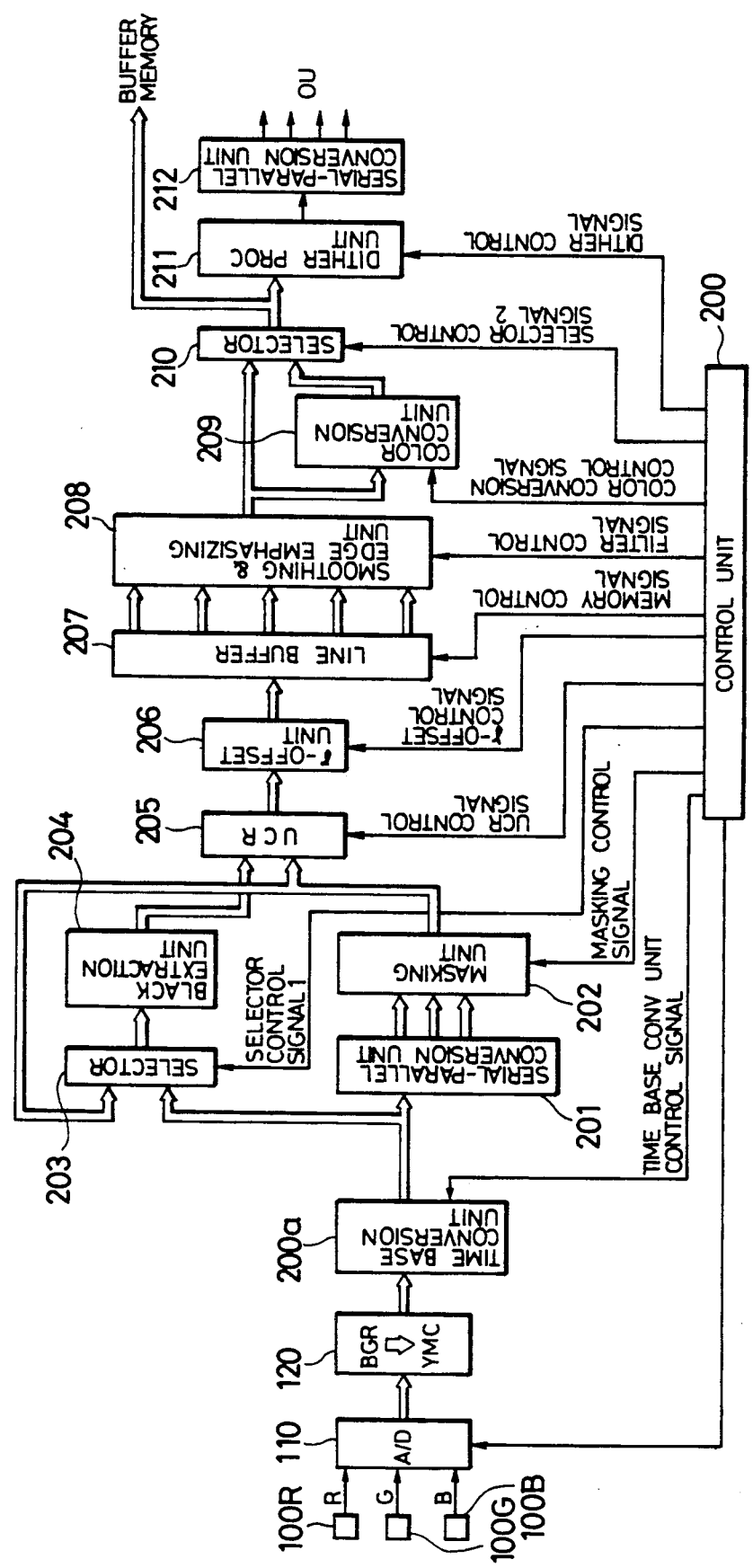
FIG. 6 is a block diagram of a color image processing apparatus constituting a second embodiment.

FIG. 6 is a block diagram of a color image processing apparatus constituting a second embodiment.

There are provided CCD line sensors 100R, 100G, 100B for respectively detecting the R, G and B components of an original image. Color signals from the CCD line sensors are converted, in an analog-to-digital converter 110, into a color-sequential digital signal.

Consequently the A/D converter 110 releases digital data in the sequence of B, G, R, B, G, R,...

The obtained digital data are converted, in a complementary color conversion circuit 120, into complementary color data Y, M, C in the sequence of Y, M, C, Y, M, C,...

The color-sequential color image data thus obtained are supplied to a time base conversion unit 200a which converts the frequency of the image data according to a time base conversion control signal supplied from a control unit 200. The image data thus obtained, which will hereinafter be called input image data, are converted, in a serial-parallel conversion unit 201, into parallel signals of yellow (Y), magenta (M) and cyan (C) and then supplied to masking unit 202 and a selector 203.

The masking unit 202 effects a correction for ink color impurity according to following equations:

$$\begin{bmatrix} Y' \\ M' \\ C' \end{bmatrix} = \begin{bmatrix} a11 & a12 & a13 \\ a21 & a22 & a23 \\ a31 & a32 & a33 \end{bmatrix} \begin{bmatrix} Y \\ M \\ C \end{bmatrix}$$

wherein Y, M and C are input data while Y', M' and C' are output data.

These nine coefficients are determined by a masking control signal from the control unit 200. After correction in the masking unit 202, the output thereof is supplied as a serial signal to the selector 203 and a UCR unit 205.

The selector 203 receives the input image data and the image data from the masking unit 202.

The selector 203 normally selects the input image data in response to a selector control signal 1 from the control unit 200. However, in case the color correction in an input system is not sufficient, it selects the image data from the masking unit 202 in response to the control signal 1. Serial image data from the selector 203 are supplied to a black extraction unit 204, which detects, as black data, the minimum value of Y, M and C. The black data thus detected are supplied to the UCR unit 205.

The UCR unit subtracts black data from each of the Y, M and C signals, and multiplies a coefficient by the black data. More specifically, the black data and the image data from the masking unit 202 are subjected, in the UCR unit 205, after correction of delay in time, to following processes:

$$Y' = Y - a_1 Bk$$

$$M' = M - a_2 Bk$$

$$C' = C - a_3 Bk$$

$$Bk' = a_4 Bk$$

wherein Y, M, C and Bk are input data and Y', M', C' and Bk' are output data. The coefficients $a_1$, $a_2$, $a_3$ and $a_4$ are determined by a UCR control signal supplied from the control unit 200.

The data released from the UCR unit 205 are supplied to a gamma-offset unit 206 for effecting following tonal correction:

$$Y' = b_1(Y - C_1)$$

$$M' = b_2(M - C_2)$$

$$C' = b_3(C - C_3)$$

$$Bk' = b_4(Bk - C_4)$$

wherein Y, M, C and Bk are input data of the gamma-offset unit, and Y', M', C' and Bk' are output data thereof. Constants $b_1$–$b_4$ and $C_1$–$C_4$ are determined by a gammaoffset control signal supplied from the control unit 200.

Data subjected to tonal correction in gammaoffset unit 206 are then supplied to a line buffer 207 for storing image data of N lines. Line buffer 207 releases data of 5 lines in parallel, required for a smoothing and edge enhancing unit 208 to be explained later. The data of five lines are supplied to a spatial filter, of which size is variable by a filter control signal from the control unit 200, thus being subjected to smoothing and then edge enhancement. In smoothing, image noises are removed by taking the average density of an object pixel and surrounding pixels as the density of the object pixel. Also the edge enhancement is conducted by adding, to the density of an object pixel, an edge signal which is equal to the difference between the density of the object pixel and the smoothed signal. The details of the smoothing and edge enhancing unit 208 will be explained later.

The image data from said unit 208 are supplied to a color conversion unit 209 and are subjected to a color conversion, in response to a color conversion control signal from the control unit 200. More specifically the color conversion unit 209 performs color replacements according to data, indicating colors to replace, colors to be replaced and an effective area of such color replacement, to be entered in advance for example by a digitizer. The detailed explanation of the color conversion unit 209 will be omitted in the present text. The image data from the smoothing and edge enhancing unit 208 or the image data after color conversion are selected by a selector 210, in response to a selector control signal 2, and the selection is made for example by designation of an effective area entered by the digitizer. The image data selected by the selector 210 are supplied to an unrepresented buffer memory and a dither process circuit 211 for binary digitizing.

The buffer memory system mentioned above will not be explained in detail in the present text.

The dither process circuit 211 for binary digitizing receives serial image data in a sequence of Y, M, C and Bk of 8 bits each.

The dither unit 211 has a memory space for each color of 6 bits in the main and sub scanning directions or 4 bits in the main scanning direction and 8 bits in the sub scanning direction. The dither matrix size and the dither threshold values in the matrix are determined by a dither control signal from the control unit 200. In the function of dither circuit, the threshold values of the memory space are read by counting an image section signal of a line of the CCD line sensor in the main scanning direction and an image video clock signal in the sub-scanning direction. Serial dither threshold values are obtained by serially switching the memory spaces in the order of Y, M, C and Bk, and are compared, in an unrepresented comparator, with the image data supplied from the selector 210.

The comparator releases an output:
1 if image data > threshold value, or
0 if image data < threshold value:
the thus obtained output are converted, in a serialparallel converter, into 4-bit parallel data.

In the following there will be explained each of the circuits constituting the processing apparatus shown in FIG. 6.

Time base conversion unit

Figures 8A, 8B:
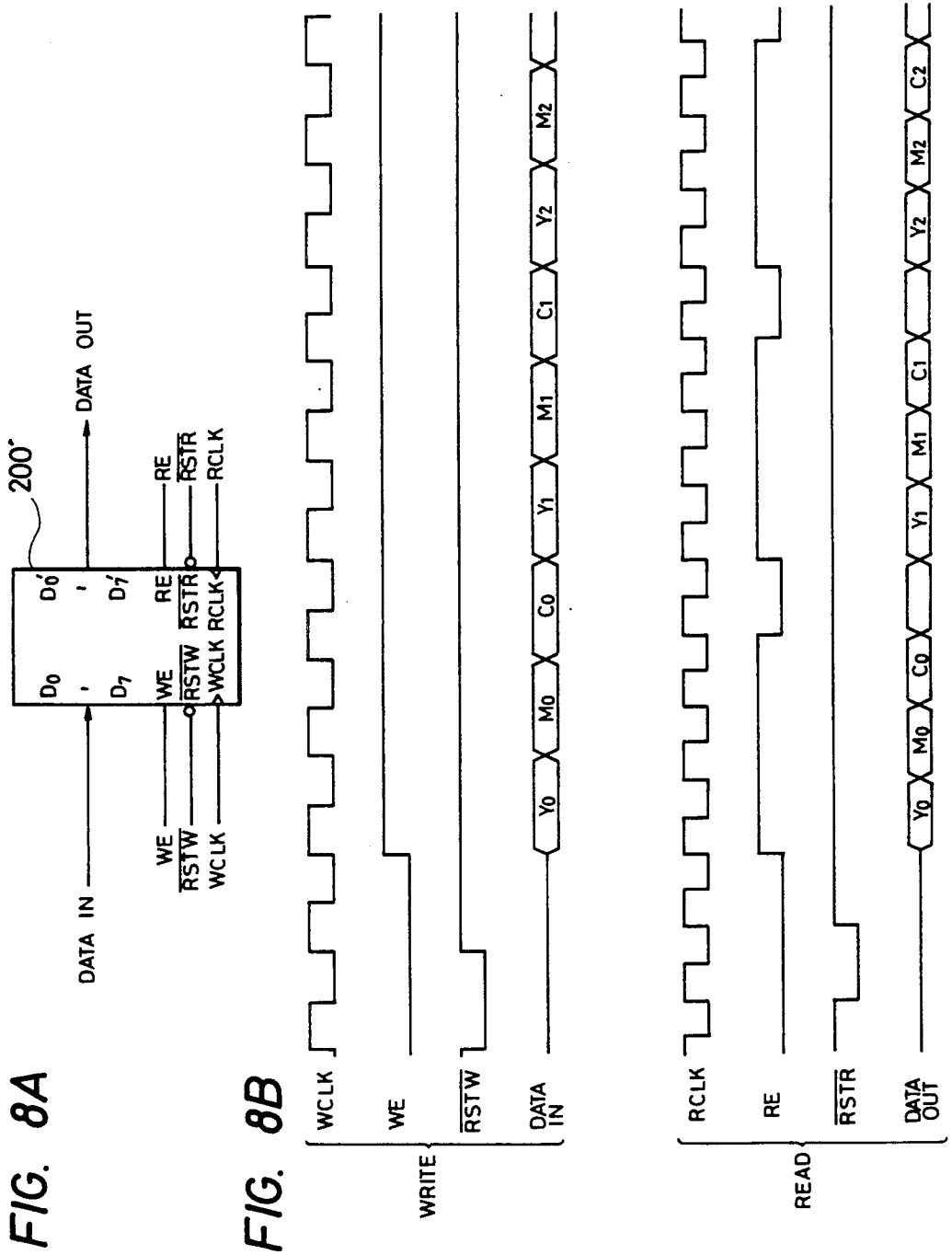
FIG. 8A is a circuit diagram of a time axis converting circuit.
FIG. 8B is a timing chart showing signals in the circuit shown in FIG. 8A.

As shown in FIG. 8A, the time base conversion unit 200a is composed of a FIFO memory 200', for example μPD42505C manufactured by NEC. The memory has independent writing counter and reading counter to enable independent control the reading and writing operations.

As shown in FIG. 8B, in response to a reset signal $\overline{RSTW}$ generated at a timing before the entry of data of a line, a signal WE indicating the period of input image data is shifted to the high level to enable data writing from address 0 of said FIFO memory. Also the data reading operation is enabled from address 0 during a high level state of a reading request signal RE, in response to a reset signal $\overline{RSTR}$ generated at timing before the output of data of a line. When signal RE is shifted to a disable state, the reading counter is retained in the corresponding address, and the reading operation is interrupted during the state.

In the present embodiment, as shown in FIG. 8B, the reset signal $\overline{RSTW}$ is entered at the start of each line, thus shifting the signal WE during the data period and to the enable state and thus effecting the data writing from address zero. Also the reading operation is conducted by entering the signal $\overline{RSTR}$ at the start of each line and shifting the signal RE to the disable state in portions where the black data are to be inserted. Consequently there is obtained a signal DATAOUT as shown in FIG. 8B, with vacancies for black data Bk. The signals RSTW, RSTR, WE, RE for controlling the FIFO memory constitute the time base conversion control signal supplied from the control unit 200.

In this manner three-color color-sequential signal is converted into a form suitable for four-color color-sequential processing.

Masking unit

For the purpose of the masking process, the three-color color-sequential signal is converted into three-color parallel signal in a serial-parallel converter 201, which is similar to the data converter of the first embodiment shown in FIG. 5.

The parallel data thus converted are supplied to a masking unit 202 for effecting table conversions with multiplication table RAM's 220–222 as shown in FIG. 9A. In the following there will be given an explanation on the conversion of Y data, with reference to FIG. 9B. In a cycle of the entered image data Y0, the table RAM's 220–222 are switched four times according to the color information to serially obtain $a_{11}Y_0$, $a_{21}Y_0$, $a_{31}Y_0$ and 0. Similar operations are repeated for the M and C data to obtain $a_{12}M_0$, $a_{22}M_0$, $a_{32}M_0$, 0, $a_{13}C_0$, $a_{23}C_0$, $A_{33}C_0$ and 0 in serial manner. A subsequent addition in an adder 223 results in a following masking calculation to obtain color-sequential output:

$$\begin{bmatrix} Y' \\ M' \\ C' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y \\ M \\ C \end{bmatrix}$$

Black extraction unit

Now reference is made to FIG. 10 for explaining the black extraction unit 204. The input image data are in an order of Y, M, C and α(vacant), wherein α is corrected in advance to FFH in hexadecimal presentation, in case of 8-bit image data. Such color-sequential image data are supplied to a comparator 224 and a flip-flop 225. In response to the data α (FFH), the flip-flop 225 forcedly latches data, and the data stored in the flip-flop 225 are compared in succession with input image data.

Only when the input image data are smaller than the data stored in the flip-flop 225, a latch timing generator 227 sends a latch pulse to the flip-flop 225 in response to the output of a comparator 224, thus latching the input image data. After the comparison of image data Y, M and C of a pixel, the minimum image data among Y, M and C are then retained in a flip-flop 226.

The color-sequential data are thus compared in succession in the order of entry, and either value is retained in each comparison to obtain the black signal component.

In this manner the minimum value, or black component, is extracted directly from the color-sequential image data.

Under-color removal unit

Figure 11:
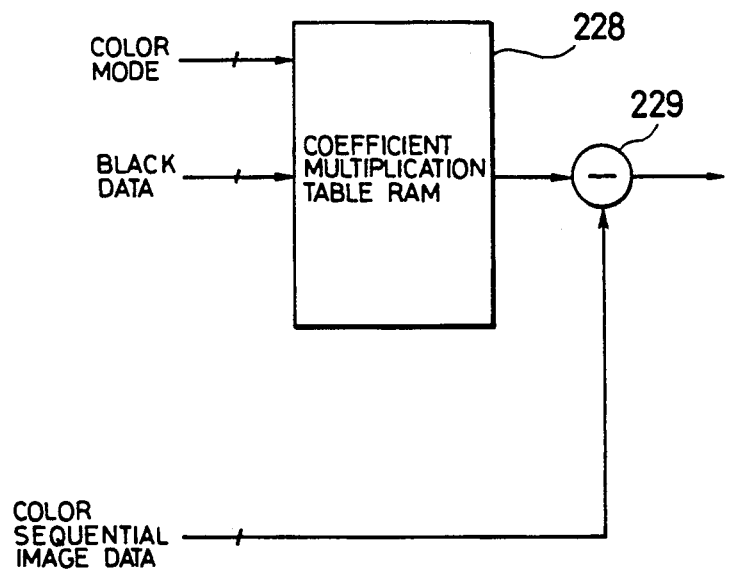
FIG. 11 is a circuit diagram of an under-color removal circuit of the present invention.

Now reference is made to FIG. 11 for explaining the under-color removal unit. A coefficient multiplication table RAM 228 receives the black data and the color mode signal from the control unit 200, and the color mode is changed in an order of Y, M, C and Bk during the reception of black data for a pixel, whereby the coefficient table is switched for each color to effect a coefficient multiplication independently for each color. The black data after coefficient multiplication are subtracted, in a subtractor 229, from color-sequentially supplied image data.

In this manner a successive combination of black data and color-sequential image data allows one to obtain color-sequential image data subjected to under-color removal.

Gamma-offset unit

Figure 12:
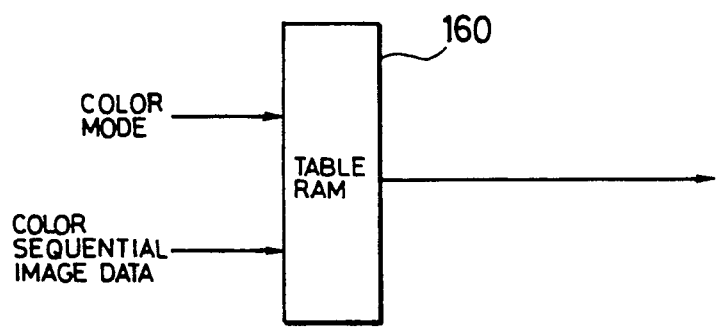
FIG. 12 is a circuit diagram of a gamma-offset circuit of the present invention.

Now reference is made to FIG. 12 for explaining a gamma-offset unit for effecting a gamma correction.

The gamma-offset unit performs, in a similar manner as in the coefficient multiplication table RAM 228 shown in FIG. 11, the following calculations by means of a RAM 160:

$$Y' = \alpha_1(Y - \beta_1)$$

$$M' = \alpha_2(M - \beta_2)$$

$$C' = \alpha_3(C - \beta_3)$$

$$Bk' = \alpha_4(Bk - \beta_4)$$

Input image data are subjected to the calculation of gamma-offset for each color, by table switching according to the color mode signal.

Smoothing unit

Figure 13:
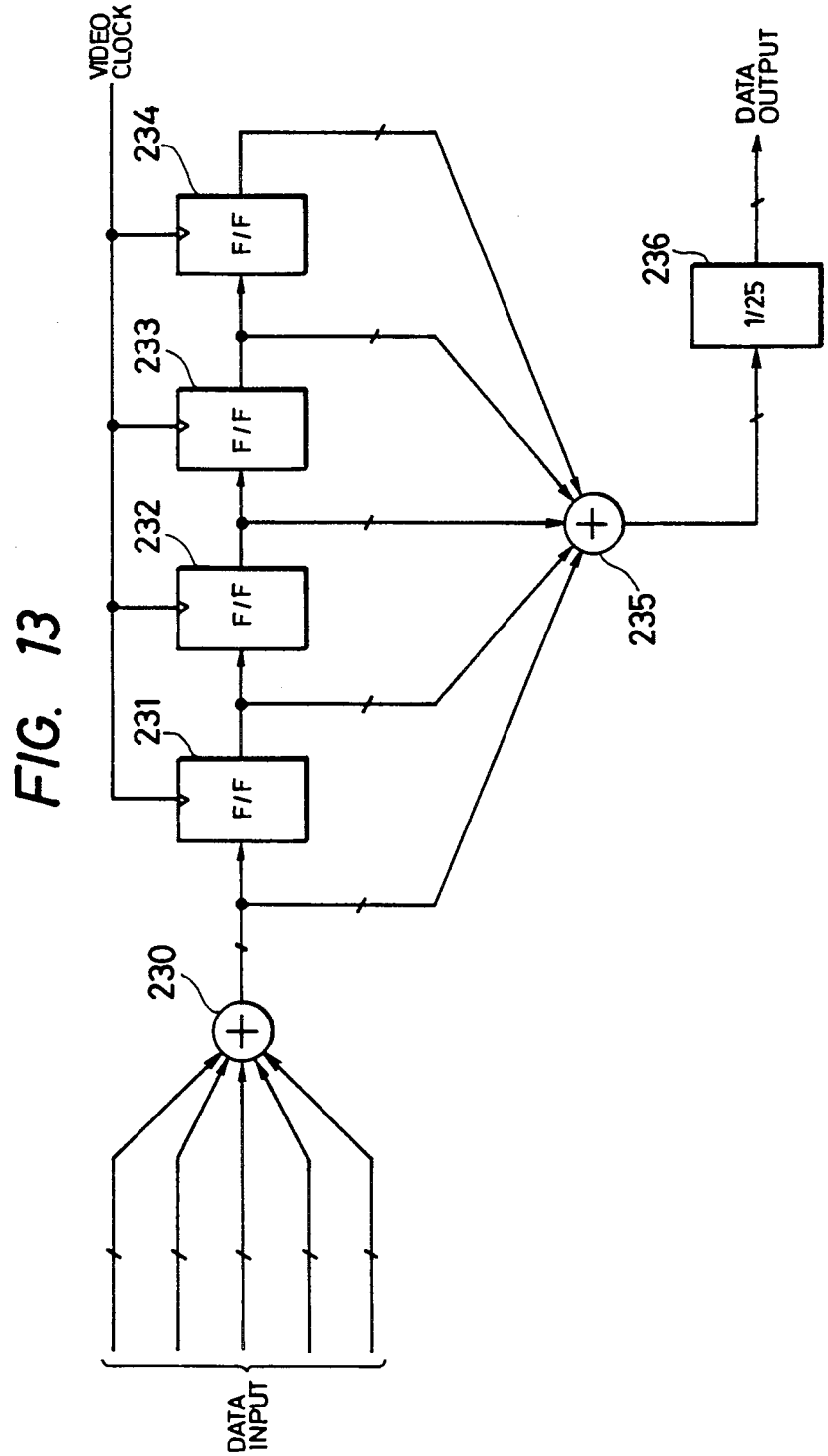
FIG. 13 is a circuit diagram of a smoothing circuit of the present invention.

Now reference is made to FIG. 13 showing the smoothing unit.

Color-sequential image data in line unit are stored in a line buffer 207. The color-sequential image data are released in parallel in the unit of 5 lines, in order to effect a filtering operation in an a 5×5 area. As shown in FIG. 13, the color-sequential image data of five lines are added in an adder 230, and then delayed in serially connected four flip-flops 231-234 by a time corresponding to four pixels, thereby enabling filtration for respective color for the sequentially entered image data. Though the present embodiment employs a 5×5 filter matrix, the size of matrix is not critical. The image data thus delayed are added in an adder 235, and are then reduced to 1/25 by a table conversion in a division RAM 236.

As explained above, the use of delaying means for delaying the color-sequential image data by a time corresponding to the number of colors, and the use of plural image signals obtained from the delaying means allow one to effect a sequential spatial filtering on the image data of respective color. For example an edge enhancement is made possible though the details will be omitted in the present text.

Dither process unit

Figure 14:
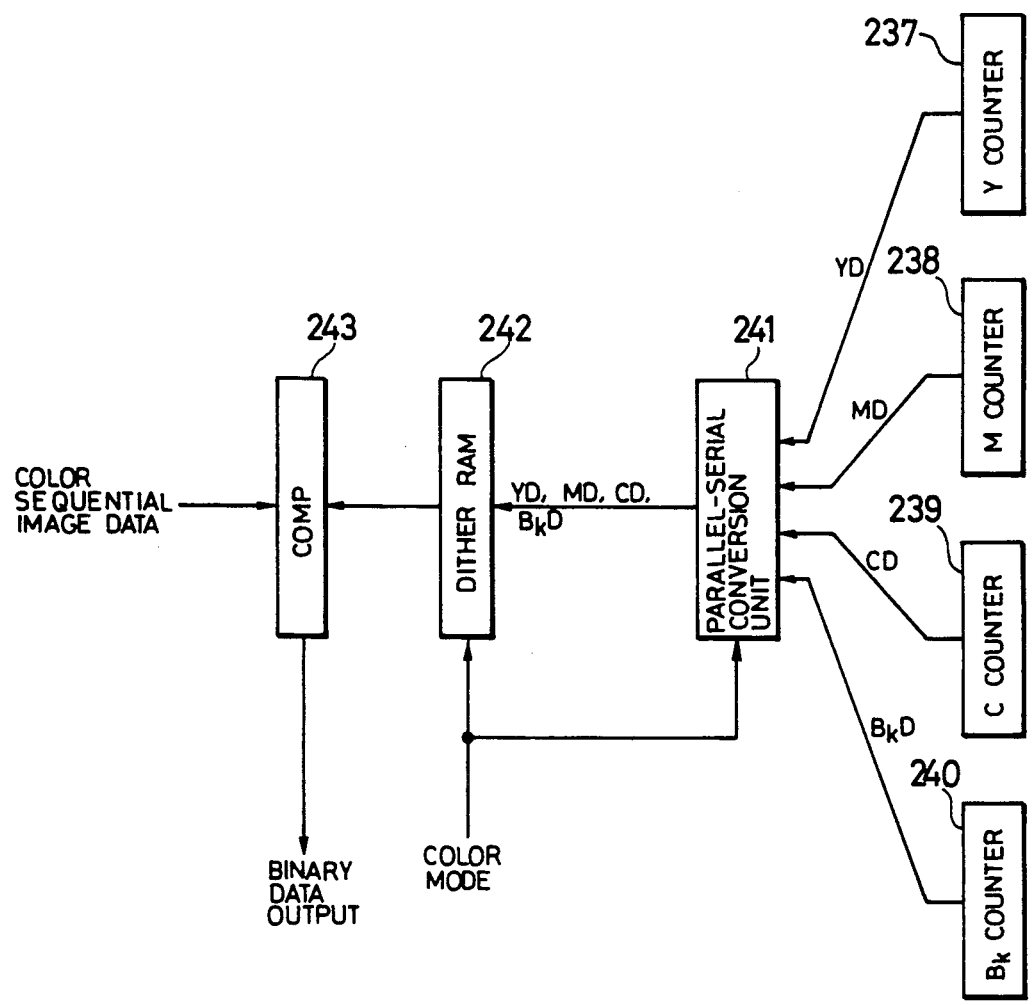
FIG. 14 is a circuit diagram of a dither process circuit of the present invention.

Now reference is made to FIG. 14 showing the dither process unit 211, equipped with counters 237-240 for selecting different dither processes for respective colors. Counts YD, MD, CD and BkD of the counters for four colors are sequentially supplied, in this order, to a dither RAM 242 through a parallel-serial converter 241. The dither RAM 242 independently changes the dither, threshold values for respective colors, by switching upper addresses according to the color mode signal. Thus the dither RAM 242 supplies the dither threshold values in color-sequential manner to a comparator 243, which compares the color-sequential image data with the color-sequential threshold values to release, after binary conversion and through a serial-parallel converter 212, a 4-bit signal including one bit for each of Y, M, C and Bk.

In this manner dither-processed color image data are obtained by generating threshold value signals for different colors in the same color sequence as that of the color-sequential image data, and by comparing the color-sequential image data with color-sequential threshold value signals in succession.

As explained in the foregoing the color-sequential image data can be utilized in various processes other than the masking process, such as black extraction, undercolor removal, gamma correction, dither process, smoothing and edge enhancement.

The circuit for processing color-sequential image data of the present embodiment can be modified in various manners.

Third embodiment

In the following there will be explained a third embodiment of the present invention.

Figure 15:
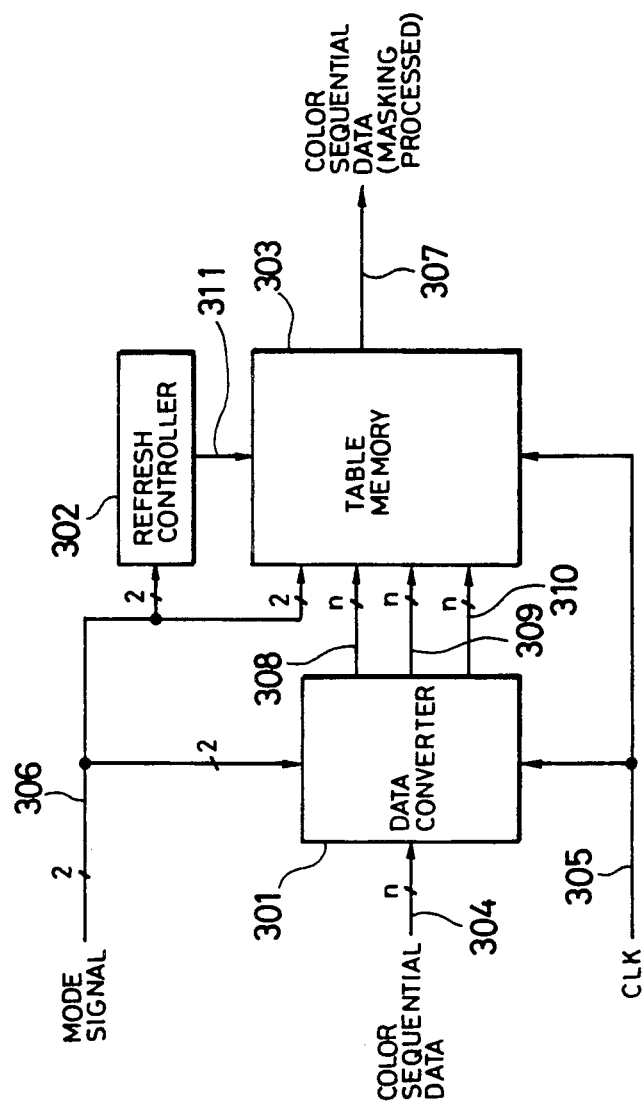
FIG. 15 is a circuit diagram of a masking circuit of the present invention.
Figures 16, 17:
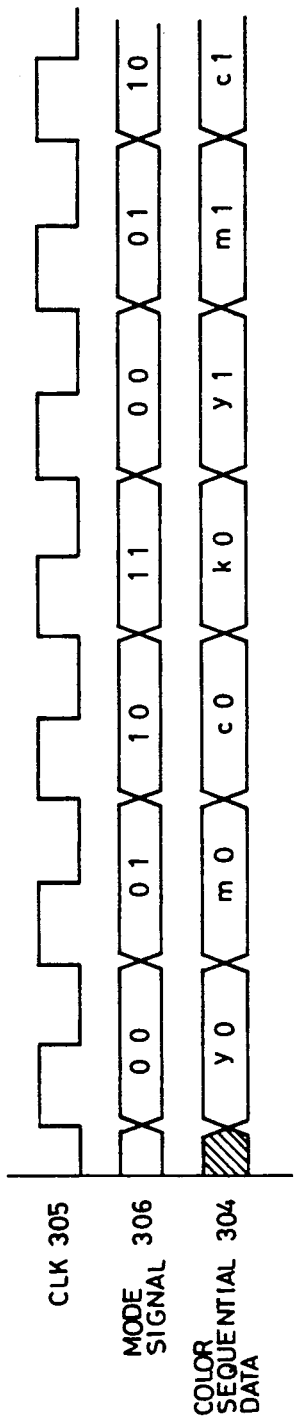
FIG. 16 is a timing chart showing signals in the circuit shown in FIG. 15.
FIG. 17 is a chart showing color modes.

Masking circuit: FIGS. 15 to 17

FIG. 15 is a block diagram of a masking circuit, constituting a third embodiment of the present invention.

In FIG. 15 there are shown a data converter 301 for converting color-sequential image data 304, entered in synchronization with a clock signal 305, into parallel data; a refresh controller 302 for controlling the refreshing operation of a dynamic RAM constituting a table memory 303, which stores masking data and releases color-sequential data 307 in synchronization with a clock signal 305, in response to parallel image data and a mode signal supplied from the data converter 301 as address signals; color-sequential data 304 entered in synchronization with the clock signal 5; and 2-bit mode signal 306 indicating color components of the color-sequential data 304.

A timing chart in FIG. 16 shows the relationship of the clock signal 305, mode signal 306 and color-sequential data 304, wherein y0, m0, c0 and k0 are first image data respectively of yellow, magenta, cyan and black, and y1, m1, c1 and k1 indicate second image data of respective colors.

FIG. 17 shows the color codes of the 2-bit mode signal 306, wherein "00" stands for yellow, "01" for magenta, "10" for cyan and "11" for black.

Figure 18:
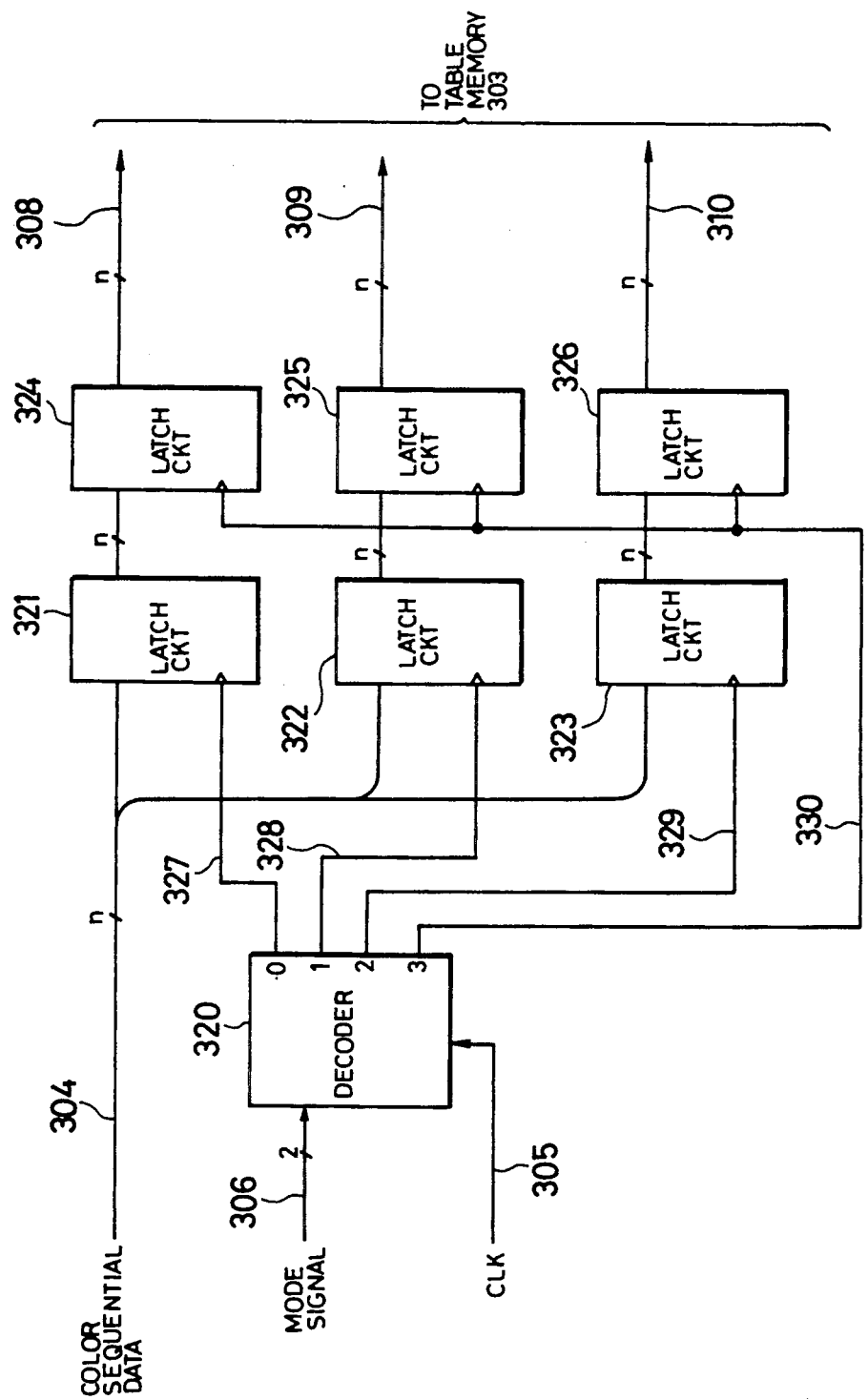
FIG. 18 is a block diagram of a data converter of the present invention.

Data converter: FIG. 18

FIG. 18 is a block diagram of the data converter 301.

A decoder 320 receives the mode signal 306 and the clock signal 305, and releases latch signals 327-330 in synchronization with said clock signal 305, for latching latch circuits 321-326.

A latch signal 327 is released by the decoder 320 when the mode signal 306 is in the mode "00". Similarly latch signals 328, 329 and 330 are released respectively in the modes "01", "10" and "11". Consequently the latches 321, 322, 323 respective latch yellow data, magenta data and cyan data.

In this manner the yellow data 308, magenta data 309 and cyan data 310 of n bits each and the mode signal 306 are entered as address signals to the table memory 303, and the color-sequential data 307 are read in synchronization with the clock signal 305 as shown in FIG. 19.

Timing of table memory reading: FIG. 19

FIG. 19 is a timing chart showing the input timing of color-sequential data 304, and the read-out timing and refresh timing of the table memory 303.

The yellow data y0, magenta data m0 and cyan data c0 are respectively entered at timings T1, T2 and T3, and the color data are latched in respective latches 324-326 at a timing T4.

Also at the same timing T4, the refresh signal 311 is supplied from the refresh controller 302 to the DRAM of the table memory 303, thereby refreshing the DRAM.

Color-sequential data y0', obtained by a masking in response to the address signals y0, m0, c0 and mode signal 306 "00" supplied to the table memory 303, are released at a timing T5, in synchronization with the clock signal 305. Data m0' are read at a timing T6 in response to the mode signal 306 "01", and data c0' are read at a timing T7 in response to the mode signal "10". In this manner the input color-sequential data are subjected to a masking process in the table memory 303, and released as masked color-sequential data 307 which are delayed by a number of clock signals corresponding to the number of input color data.

As explained in the foregoing, the present embodiment is featured by using a DRAM as the masking $ table, entering color-sequential data containing color data of a color not subjected to the masking process, and refreshing the DRAM at the input timing of the color data, thereby achieving a refresh operation without interrupting the masking process and realizing a high-speed process with a simple circuit structure.

The timing for black data may seem unnecessary for masking process but is essential for example in the black extraction, and does not, therefore deteriorate the throughout of the entire color image processing.

In the foregoing explanation there have been employed color-sequential data consisting of yellow, magenta, cyan and black data, but a similar effect can also be attained with color-sequential data of other forms, for example those consisting of red, green, blue and black data.

As explained in the foregoing, the use of a dynamic RAM for the masking table allows are to provide an inexpensive and rewritable image processing circuit of a large capacity with a small circuit area.

Also as explained in the foregoing, it is rendered possible, according to the present invention, to effect an image processing directly on color-sequential color image data, thereby reducing the number of circuit components and to provide an image processing apparatus less expensive than in the prior art.

The present invention is not limited to the foregoing embodiments but is subject to various modifications and variations within the scope and spirit of the appended claims.

What is claimed is:

1. A color image processing apparatus comprising:
input means for entering first color-sequential image data in which plural color component signals are sequentially arranged;
first converting means for converting the first color-sequential image data into first parallel image data;
color image processing means for effecting color image processing on the first parallel image data obtained from said first converting means, said color image processing means outputting second parallel image data by performing calculation using the first parallel image data together;
second converting means for converting the second parallel image data output by said color image processing means into second color-sequential image data; and supply means for supplying the second color-sequential image data to a color-sequential image data processing means at a next stage of processing of the plural color component signals, wherein the second color-sequential image data output by said second converting means is sequentially arranged having the same form as that of the first color-sequential image data entered by said input means.

2. A color image processing apparatus according to claim 1, wherein said input means includes means for sequentially entering Y, M and C color component signals.

3. A color image processing apparatus according to claim 1, further comprising said color-sequential image data processing means, wherein said color image processing means and said color-sequential image data processing means color process said plural color component signals differently.

4. A color image processing apparatus comprising according to claim 1, wherein said first converting means further comprises:
separation means for separating each color component signal from said plural color component signals input by said input means; and
delay means for respectively delaying by a predetermined period of time the color component signals separated by said separation means.

5. A color image processing apparatus according to claim 4, wherein said delay means includes means for delaying the color component signals separated by said separation means by different predetermined periods of time, the different predetermined periods of time corresponding to the respective color components.

6. A color image processing apparatus according to claim 1, further comprising second input means for entering a mode signal indicating the currently processed color component signal of the color-sequential image data.

7. A color image processing apparatus according to claim 6, wherein said second converting means includes means for sequentially outputting the color component signals indicated by the mode signal.

8. A color image processing apparatus according to claim 1, wherein said color image processing means includes a masking process circuit into which said plural color component signals are input.

9. A color image processing apparatus according to claim 8, wherein said color image processing means includes a black component extraction circuit into which said plural color component signals are input.

10. A color image processing apparatus according to claim 9, wherein said color image processing means further comprises an under-color removal circuit which removes a black component extracted by said black component extraction circuit from each color component signal.

11. A color image processing apparatus comprising:
first input means for entering first color-sequential image data in which plural color component signals are sequentially arranged;
means for converting the first color-sequential image data into parallel image data;
color image processing means for effecting a color image processing of the parallel image data obtained from said means for converting, to obtain second color-sequential image data; and
second input means for entering a mode signal indicating the color represented by the currently processed color component signal currently being processed by said color image processing means, wherein the mode signal is input in parallel with the first color-sequential image data.

12. A color image processing apparatus according to claim 2, wherein said color image processing means includes a masking process circuit receiving said plural color component signals.

13. A color image processing apparatus according to claim 12, wherein said masking process circuit is adapted to obtain color signals of different colors in a sequential manner by utilizing said plural color component signals.

14. A color image processing apparatus according to claim 11, wherein said color image processing means includes a black component extracting circuit receiving said plural color component signals.

15. A color image processing apparatus according to claim 14, wherein said color image processing means further comprises an under-color removal circuit for subtracting a black component, extracted in said extracting circuit, from different color component signals in succession.

* * * * *

UNITED STATES PATENT AND TRADEMARK OFFICE
CERTIFICATE OF CORRECTION

PATENT NO. : 5,060,059

DATED : October 22, 1991

INVENTOR(S) : Tetsuzo Mori, et al

It is certified that error appears in the above-identified patent and that said Letters Patent is hereby corrected as shown below:

Title Page:
IN [56] REFERENES CITED

Under "U.S. PATENT DOCUMENTS", insert:
      --4,745,466  8/1988  Yoshida et al. .... 358/80
      S.N. 129,365  2/1984  Sugiura ........ 358/80
      S.N. 271,362  3/1984  Abe ............ 358/75--.

Under "FOREIGN PATENT DOCUMENTS", insert:
     --3202783  8/1983  Fed. Rep. of Germany .... H04N/1/46--.

Under "OTHER PUBLICATIONS", insert:

--Springstein, K., "Elektronische Bildverarbeitung von A-Z," Itzehoe, Verlag Beruf & Schule, pp. 115 to 118, 1982.--.

COLUMN 1

Line 10, "2." should read --1.--.
    Line 20, "processed" should read --thus processed--.
    Line 35, "readonly" should read --read-only-- and "However" should read --However,--.

COLUMN 3

Line 24, "colorse-" should read --color-se- --.
    Line 39, "and." should read --and--.
    Line 45, "Thus" should read --The thus--.

UNITED STATES PATENT AND TRADEMARK OFFICE
CERTIFICATE OF CORRECTION

PATENT NO. : 5,060,059

DATED : October 22, 1991

INVENTOR(S) : Tetsuzo Mori, et al

It is certified that error appears in the above-identified patent and that said Letters Patent is hereby corrected as shown below:

COLUMN 4

Line 21, "data converter 19" should read --data converter 10-- and "to reduce" should be deleted.
Line 29, "$" should be deleted.
Line 44, "compliment" should read --complement--.
Line 66, "signal Thus" should read --signal. Thus--.

COLUMN 6

Line 32, "gammaoffset" should read --gamma-offset--.
Line 34, "gammaoffset" should read --gamma-offset--.
Line 52, "said" should be deleted.

COLUMN 7

Line 27, "the" should read --and the-- and "serialparal-" should read --serial-paral- --.
Line 38, "control the" should read --control of the--.
Line 63, "$\overline{RSTW}$, $\overline{RSTR}$, $\overline{WE}$, $\overline{RE}$" should read --$\overline{RSTW}$, $\overline{RSTR}$, $\overline{WE}$, $\overline{RE}$--.

COLUMN 8

Line 18, "$A_{33}C_0$" should read --$a_{33}C_0$--.
Line 65, "subtractor" should read --subtracter--.

COLUMN 9

Line 29, "an" should be deleted.
Line 45, "example" should read --example,--.
Line 56, "dither," should read --dither--.

UNITED STATES PATENT AND TRADEMARK OFFICE
CERTIFICATE OF CORRECTION

PATENT NO. : 5,060,059

DATED : October 22, 1991

INVENTOR(S) : Tetsuzo Mori, et al

It is certified that error appears in the above-identified patent and that said Letters Patent is hereby corrected as shown below:

COLUMN 10

Line 7, "undercolor" should read --under-color--.
    Line 31, "clock signal 5;" should read
        --clock signal 305;--.

COLUMN 11

Line 20, "$" should be deleted.
    Line 29, "therefore" should read --therefore,--.
    Line 30, "throughout" should read --throughput--.
    Line 38, "are" should read --one--.

COLUMN 12

Line 19, "comprising" should be deleted.

Signed and Sealed this

Thirteenth Day of April, 1993

*Attest:*

STEPHEN G. KUNIN

*Attesting Officer*      *Acting Commissioner of Patents and Trademarks*